United States Patent [19]

Yamada et al.

[11] Patent Number: 4,948,412
[45] Date of Patent: Aug. 14, 1990

[54] METHOD OF FUSION SPLICING SINGLE-MODE OPTICAL FIBERS USING AN ARC DISCHARGE

[75] Inventors: Takeshi Yamada, Sakura; Yasukuni Osato, Narashino, both of Japan; Masao Suzuki, New York, N.Y.; Okosu Watanabe, Chiba; Osamu Kawata, Mito, both of Japan

[73] Assignees: Fujikura Ltd.; Nippon Telegraph and Telephone Corporation, both of Tokyo, Japan

[21] Appl. No.: 772,950

[22] Filed: Sep. 5, 1985

[51] Int. Cl.$^5$ .................. C03B 23/20; G02B 6/255
[52] U.S. Cl. ........................ 65/4.21; 65/4.2; 65/29
[58] Field of Search ............ 65/2, 4.1, 4.2, 4.3, 65/17, 29, 4.21

[56] References Cited

U.S. PATENT DOCUMENTS

| | | | |
|---|---|---|---|
| 4,266,852 | 5/1981 | Higgins et al. | 65/4.2 |
| 4,350,867 | 9/1982 | Kinoshita et al. | 65/4.1 |
| 4,557,556 | 12/1985 | Decker, Jr. | 65/4.2 |

FOREIGN PATENT DOCUMENTS 142062A  5/1985  European Pat. Off. ........ 65/4.2

OTHER PUBLICATIONS

Kato et al., Applied Optics, vol. 23, No. 15, Aug. '84, pp. 2654–2659; "Arc-fusion Splicing of Single-Mode Fibers, 3: A Highly Efficient Splicing Technique".
Hatakeyarra et al., IEEE Journal of Quantum Electronics, vol. QE-14, No. 8, Aug. '78, pp. 614–619. "Fusion Splices For Single-mode Optical Fibers".
Kato et al., Review of the Electrical Communication Labs, vol. 31, No. 3, May '83, pp. 282–289; "Arc-Fusion Splice of Single-Mode Fiber Cables".
Kawata et al., Journal of Lightwave Technology vol. LT-2, No. 2, Apr. '84, pp. 185–191 "A Splicing and Inspection Technique for Single-Mode Fibers Using Direct Core Monitoring".

Primary Examiner—Kenneth M. Schor
Attorney, Agent, or Firm—Frishauf, Holtz, Goodman & Woodward

[57] ABSTRACT

Disclosed is a method of fusion splicing single-mode optical fibers, in which an offset distance D, between the axes of the optical fibers subjected to fusion splicing, is measured when the axes of the cores of the optical fibers are aligned with one another. The arc discharge time, current and/or energy is determined according to the measured distance D.

5 Claims, 5 Drawing Sheets

METHOD OF FUSION SPLICING SINGLE-MODE OPTICAL FIBERS USING AN ARC DISCHARGE

BACKGROUND OF THE INVENTION

This invention relates to a method of fusion splicing single-mode optical fibers using an arc discharge.

In fusion splicing single-mode optical fibers using an arc discharge, it is necessary to center cores $12_1$ and $12_2$ of optical fibers $10_1$ and $10_2$ to be spliced for low loss splicing (FIG. 1). Thereafter, optical fibers $10_1$ and $10_2$ are subjected to fusion splicing with an arc discharge. However, cores $12_1$ and $12_2$ of optical fibers $10_1$ and $10_2$ to be spliced are generally displaced from the axes $14_1$ and $14_2$ of optical fibers $10_1$ and $10_2$, respectively, as shown in FIG. 1. Therefore, when cores $12_1$ and $12_2$ of optical fibers $10_1$ and $10_2$ are centered to each other, axes $14_1$ and $14_2$ of optical fibers $10_1$ and $10_2$ have therebetween displacement or distance D, as shown in FIG. 1. When optical fibers $10_1$ and $10_2$ are spliced using an arc discharge, surface tension occurs at the spliced portion of optical fibers $10_1$ and $10_2$ to reduce displacement D. Therefore, cores $12_1$ and $12_2$ of optical fibers $10_1$ and $10_2$ are sloped at the spliced portion, as seen in FIG. 2. The slope causes a loss in fusion splicing. A large slope in spliced cores $12_1$ and $12_2$ makes it impossible to obtain a low loss splicing of spliced optical fibers $10_1$ and $10_2$. Also it is required for the spliced optical fibers to have at least a certain mechanical strength.

SUMMARY OF THE INVENTION

This invention has been achieved in consideration of the above-mentioned circumstances, the object being to provide a method of fusion splicing single-mode optical fibers using an arc discharge, which can provide low-loss spliced optical fibers, even when the optical fibers subjected to fusion splicing have cores displaced from the axes of the optical fibers.

According to the invention, there is provided a method of fusion splicing single mode optical fibers using an arc discharge comprising the steps of: arranging two single-mode optical fibers to be subjected to fusion splicing opposite one another on a line; aligning the axes of the cores of the optical fibers to each other; measuring a distance D between the axes of the optical fibers when the cores of the optical fibers are aligned; determining conditions for an arc discharge to be applied to the optical fibers according to the distance D; and applying an arc discharge to the optical fibers according to the determined arc discharge conditions.

DETAILED DESCRIPTION OF THE PREFERRED EMBODIMENTS

Figure 1:
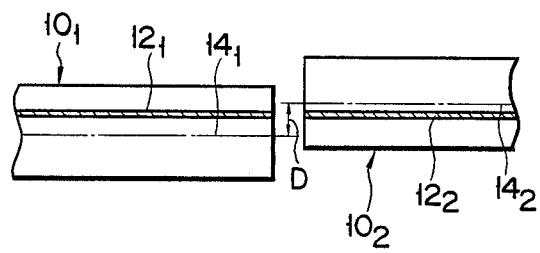
FIG. 1 shows two optical fibers subjected to fusion splicing with the cores centered to each other, the cores of the optical fibers being displaced from the axes of the optical fibers.
Figure 2:
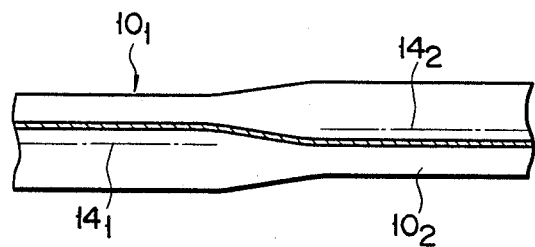
FIG. 2 shows the spliced optical fibers.

Embodiments of the invention will now be described with reference to the drawings. The same reference numerals are employed for the same parts through all the drawings.

Figure 3:
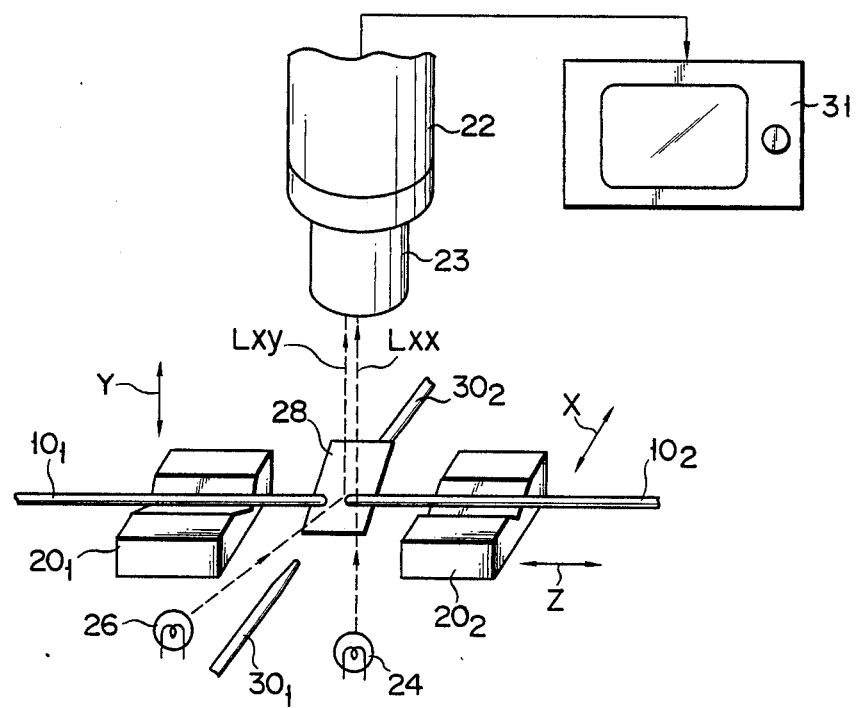
FIG. 3 is a schematical view of a fusion splicing apparatus to which a method of fusion splicing single mode optical fibers of the invention is applied.

In fusion splicing single-mode optical fibers using an arc discharge, two single-mode optical fibers $10_1$ and $10_2$ subjected to fusion splicing are supported on the V grooves of V groove members $20_1$ and $20_2$ in such a manner that optical fibers $10_1$ and $10_2$ are arranged to oppose each other on a Z axis (FIG. 3). Thereafter, core $12_1$ of optical fiber $10_1$ and core $12_2$ of optical fiber $10_2$ are centered to each other, using a known technique (refer to FIG. 1). After cores $12_1$ and $12_2$ are centered, distance or displacement D between axis $14_1$ of optical fiber $10_1$ and axis $14_2$ of optical fiber $10_2$ are measured. Thereafter, optical fibers $10_1$ and $10_2$ are subjected to fusion splicing using an arc discharge through discharge electrodes $30_1$ and $30_2$. The arc discharge conditions are determined according to the measurement or distance D. When distance D is large, either or both of the arc discharge time and arc discharge current are selected to be small, while the spliced portion of the cores $10_1$ and $10_2$ has or attains the required mechanical strength. On the other hand, when distance D is small, either or both of the arc discharge time and arc discharge current are selected to be large.

Figure 8:
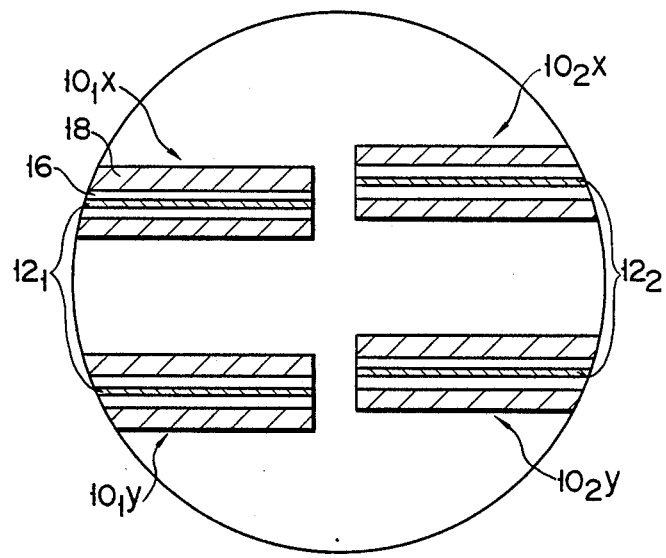
FIG. 8 shows images of optical fibers oppositely arranged as seen through a microscope.

When the cladding 16 of cores $10_1$ and $10_2$ is made of pure silica (refer to FIG. 8), the arc discharge time and/or arc discharge current is determined as described below, according to the measurement or distance D. (In FIG. 8, reference numeral 18 denotes a jacketing.)

Figure 4:
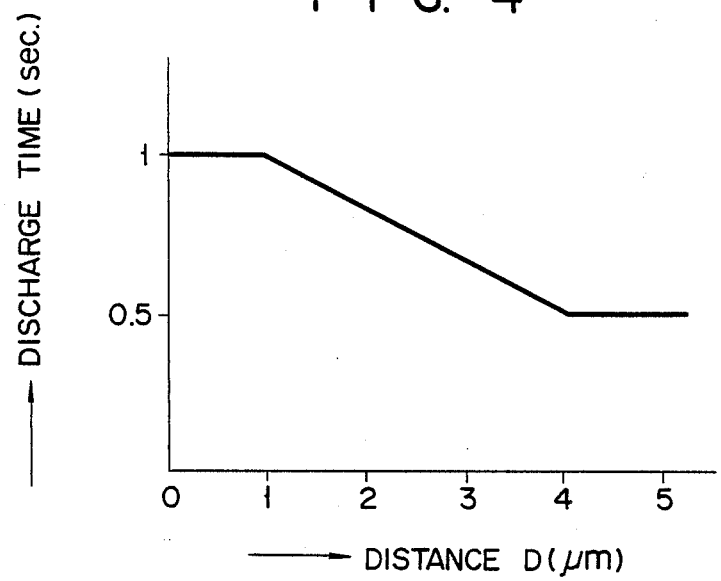
FIG. 4 shows a characteristic curve of an arc discharge time and the distance between the axes of the optical fibers when the cores of the optical fibers are centered to each other, the characteristic curve being applied to a fusion splicing method of the invention.

I. When the discharge current is fixed at 17 mA, the discharge time is determined as shown in FIG. 4, in which:

(i) When distance D is smaller than 1 μm, an arc discharge time of 1 sec is selected.

(ii) When distance D is larger than 4 μm, an arc discharge time of 0.5 sec is selected.

(iii) When distance D is between 1 μm to 4 μm, an arc discharge time of between 1 sec. and 0.5 sec. is linearly or proportionally selected according to distance D. Namely, when distance D varies from 1 μm to 4 μm, the determined arc discharge time linearly varies from 1 sec to 0.5 sec, correspondingly.

Figure 5:
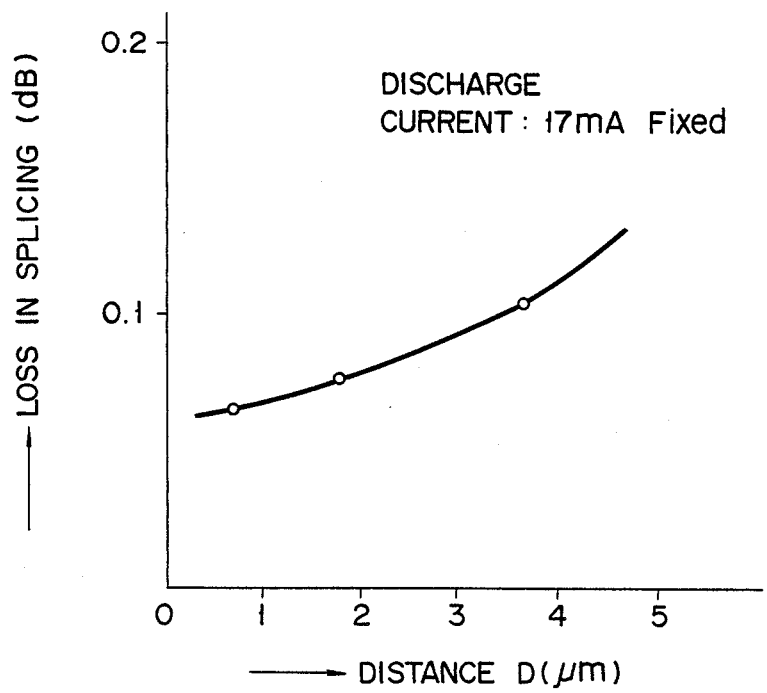
FIG. 5 shows a characteristic curve of a loss in the fusion splicing and the distance when the optical fibers are spliced, obtained when an arc discharge time is determined, with respect to the distance, as shown in the characteristic curve of FIG. 4.

As described in I-(i) above, when distance D is smaller than 1 μm, a long arc discharge time of up to 1 sec is selected. The long discharge time ensures the spliced portion of optical fibers $10_1$ and $10_2$ a sufficient mechanical strength. While, the obliquity or slope of cores $12_1$ and $12_2$ at the spliced portion of optical fibers $10_1$ and $10_2$ is small, since distance D is small and the surface tension which occurs is also small. In other words, a low-loss splicing of optical fibers $10_1$ and $10_2$ is provided, as seen in FIG. 5 which shows a characteristic curve of a loss in splicing and distance D, obtained when an arc discharge time is selected as shown in the characteristic curve in FIG. 4.

As described in I-(ii), when distance D is larger than 4 μm, a short arc discharge time of up to 0.5 sec is selected. Though the discharge time is so short, the spliced portion of optical fibers $10_1$ and $10_2$ is given the required degree of mechanical strength of 600 g. While, the obliquity of cores $12_1$ and $12_2$ at the spliced portion of optical fiber $10_1$ and $10_2$ is small, since such a short arc discharge time is selected and the surface tension which occurs is small. In other words, a low-loss splicing of optical fibers $10_1$ and $10_2$ is provided, as seen in FIG. 5.

As described in I-(iii), when distance D varies from 1 μm to 4 μm, the determined arc discharge time linearly varies from 1 sec to 0.5 sec, according to distance D. The linearly determined discharge time gives the spliced portion of optical fibers $10_1$ and $10_2$ the required degree of mechanical strength. Further, the obliquity of cores $12_1$ and $12_2$ at the spliced portion of optical fibers $10_1$ and $10_2$ is small, since the arc discharge time is linearly reduced from 1 sec to 0.5 sec, as distance D increases from 1 μm to 4 μm. In other words, the low-loss splicing of optical fibers $10_1$ and $10_2$ is provided, as seen in FIG. 5.

When the discharge time is so selected as described above, the obliquity of cores $12_1$ and $12_2$ at the spliced portion of optical fibers $10_1$ and $10_2$ is small. In other words, a low-loss splicing of optical fibers $10_1$ and $10_2$ is provided, as seen in FIG. 5. Therefore, the light transmission efficiency of an optical fiber cable formed of spliced optical fibers $10_1$ and $10_2$ is enhanced, even when distance D is large. Further, the spliced portion of optical fibers $10_1$ and $10_2$ is given at least the required degree of mechanical strength.

Figure 6:
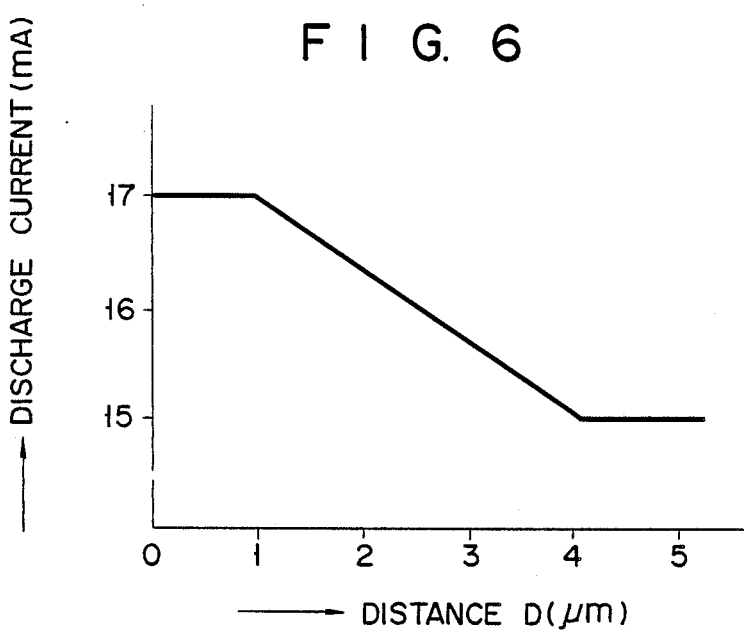
FIG. 6 shows a characteristic curve of an arc discharge current and a distance between the axes of the optical fibers when the cores of the optical fibers are centered to each other, the characteristic curve being applied to a fusion splicing method of the invention.

II. When the discharge time is fixed at 1 sec. the discharge current is determined as shown in FIG. 6, in which:

(i) When distance D is smaller than 1 μm, an arc discharge current of 17 mA is selected.

(ii) When distance D is larger than 4 μm, an arc discharge current of 15 mA is selected.

(iii) When distance D is between 1 μm to 4 μm, an arc discharge current of between 17 mA and 15 mA is linearly or proportionally selected, according to distance D. Namely, when distance D varies from 1 μm to 4 μm, the determined discharge current linearly varies from 17 mA to 15 mA.

Figure 7:
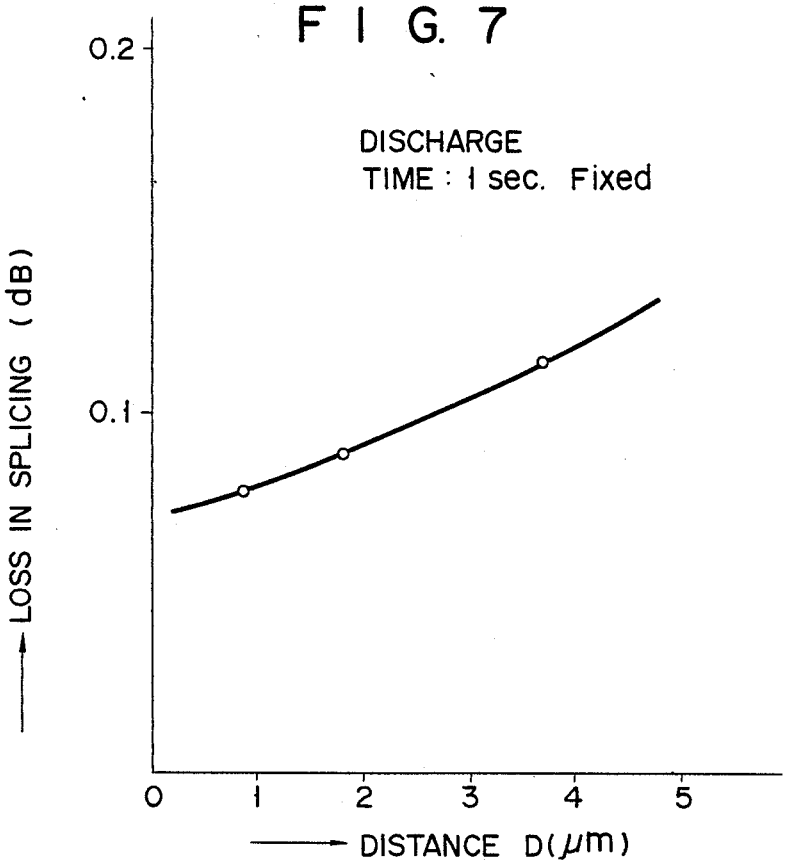
FIG. 7 shows a characteristic curve of a loss in the fusion splicing and the distance when the optical fibers are spliced, obtained when an arc discharge current is determined, with respect to the distance, as shown in the characteristic curve of FIG. 6.

As described in II-(i) above, when distance D is smaller than 1 μm, a large arc discharge current of up to 17 mA is selected. The large discharge current ensures the spliced portion of optical fibers $10_1$ and $10_2$ have sufficient mechanical strength. The obliquity or slope of cores $12_1$ and $12_2$ at the spliced portion of optical fibers $10_1$ and $10_2$ is small, since distance D is small and the surface tension which occurs is small. In other words, a low-loss splicing of optical fibers $10_1$ and $10_2$ is provided, as seen in FIG. 7 which shows a characteristic curve of a loss in splicing and distance D, obtained when an arc discharge time is selected as shown in the characteristic curve in FIG. 6.

As described in II-(ii), when distance D is larger than 4 μm, a small arc discharge current of up to 15 mA is selected. Though the discharge current is so small, the spliced portion of optical fibers $10_1$ and $10_2$ still has the required mechanical strength of 600 g. Also, the obliquity of cores $12_1$ and $12_2$ at the spliced portion of optical fibers $10_1$ and $10_2$ is small, since such a small arc discharge current is selected and the surface tension which occurs is small. In other words, a low-loss splicing of optical fibers $10_1$ and $10_2$ is provided, as seen in FIG. 7.

As described in II-(iii), when distance D varies from 1 μm to 4 μm, the arc discharge current linearly varies from 17 mA to 15 mA, according to distance D. The linearly determined discharge current gives the spliced portion of optical fibers $10_1$ and $10_2$ a required mechanical strength. The obliquity of cores $12_1$ and $12_2$ at the spliced portion of optical fibers $10_1$ and $10_2$ is small, since the arc discharge current is linearly reduced from 17 mA to 15 mA, as distance D increases from 1 μm to 4 μm. In other words, a low-loss splicing of optical fibers $10_1$ and $10_2$ is provided, as seen in FIG. 7.

When the discharge current is selected as described above, the obliquity of cores $12_1$ and $12_2$ at the spliced portion of optical fibers $10_1$ and $10_2$ is small. In other words, a low-loss splicing of optical fibers $10_1$ and $10_2$ is provided, as seen in FIG. 7. Therefore, the light transmission efficiency of an optical fiber cable formed of spliced optical fibers $10_1$ and $10_2$ is enhanced, even when distance D is large. Moreover, the spliced portion of optical fiber $10_1$ and $10_2$ is always given at least the required mechanical strength.

In the embodiments described above, the discharge time or discharge current is selected according to distance D. However, the product of the electrical power (mW) and time (sec.) shows the electrical energy level (mW.sec.). Therefore, both the discharge time and discharge current (i.e. the electrical energy) may be controlled according to distance D. In that case, substantially the same effects as those in the above-described embodiments are provided, too.

The above-mentioned embodiments refer to an optical fiber whose cladding is made of pure silica. When a cladding of an optical fiber contains an additive such as phosphor or bromine, the melting point of the cladding lowers. Therefore, if such an optical fiber containing any additive is referred to, a modification to the above-mentioned embodiments is necessary.

Distance D is measured as follows.

For measuring distance D, microscope 22 and TV (television) monitor 31 are provided (FIG. 3). Furthermore, light sources 24, 26 and deflector 28 are provided (FIG. 3). Microscope 22 is on the Y axis passing through the center of the opposite ends of optical fibers $10_1$ and $10_2$ subjected to fusion splicing arranged in opposed relation on the Z axis. Microscope 22 is positioned above the opposite ends of optical fibers $10_1$ and $10_2$. Light source 24 is on the Y axis. Light source 24 is positioned below the opposite ends of optical fibers $10_1$ and $10_2$. A light beam of light source 24 is incident upon microscope 22, in the Y axis, as light beam Lxx, through the opposite ends of optical fibers $10_1$ and $10_2$ and objective 23. Light source 26 is on the X axis which passes through the center of the opposite ends of optical fibers $10_1$ and $10_2$. Deflector 28 is on the X axis. Deflector 28 inclines by 45 degrees to the X axis so that a light beam of light source 26 is deflected to be directed in the Y axis, causing the light beam to be incident upon microscope 22 through objective 23 as light beam Lxy. One can see through microscope 22 images $10_1x$ and $10_2x$ (FIG. 8) of optical fibers $10_1$ and $10_2$, taken in X-Z plane, based on light beam Lxx emitted from light source 24. Also, one can see images $10_1y$ and $10_2y$ (FIG. 8) of optical fibers $10_1$ and $10_2$ taken in Y-Z plane, based on light beam Lxy emitted from light source 24 and deflected by deflector 28. Cores $12_1$ and $12_2$ in the images look dark.

Figure 9:
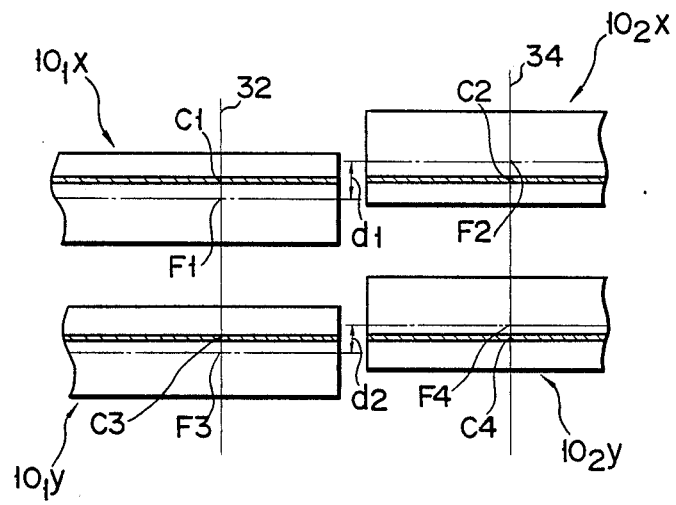
FIG. 9 shows images of optical fibers oppositely arranged, as displayed on a screen of a television camera through a microscope.
Figure 10:
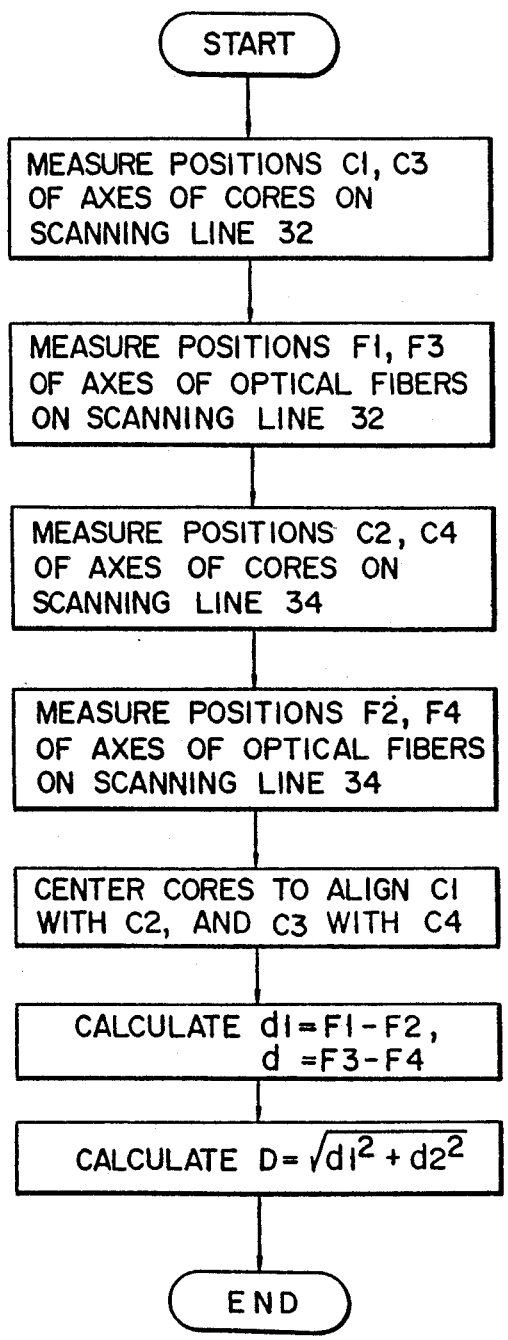
FIG. 10 shows a flow chart with which distance between the axes of oppositely arranged optical fibers are determined.

Images $10_1x$, $10_2x$, $10_1y$ and $10_2y$ are displayed on a screen of TV camera 30, as shown in FIG. 9. In measuring distance D, a position C1 on scanning line 32 orthogonal to the axis of optical fiber $10_1$, of the axis of core $12_1$ on image $10_1x$; and a position C3 on scanning line 32 orthogonal to the axis of optical fiber $10_1$, of axis of core $12_1$ on image $10_1y$, are measured (step 1 in FIG. 10). Thereafter, a position F1 on scanning line 32, of the axis of optical fiber $10_1$ on image $10_1x$; and a position F3 on scanning line 32, of the axis of optical fiber $10_1$ on image $10_1y$ are measured (step 2). After then, a position C2, on scanning line 34, of the axis of core $12_2$ on image $10_2x$, and a position C4 on scanning line 34, of the axis of core $12_2$ on image $10_2y$ are measured (step 3). Thereafter, a position F2, on scanning line 34, of the axis of optical fiber $10_2$ on image $10_2x$, and a position F4 on scanning line 34, of the axis of optical fiber $10_2$ on image $10_2y$ are measured (step 4). Following this, positions C1 and C2 are adjusted to be aligned with each other, as are positions C3 and C4, so that cores $12_1$ and $12_2$ of optical fibers $10_1$ and $10_2$ are centered (step 5). Thereafter, equations $d1 = F1 - F2$, $d2 = F3 - F4$ are carried out to provide a distance d1 between positions F1 and F2 and a distance d2 between positions F3 and F4 (step 6). After then, $$D = \sqrt{d1^2 + d2^2}$$

is carried out to provide distance D (step 7).

As can clearly be understood from the above, in the splicing method of the invention, distance D, between the axes of the optical fibers to be fusion spliced, is measured, and according to the measurement, discharge conditions are properly selected. Therefore, the obliquity of the cores at the spliced portion of the optical fibers is small. In other words, a low-loss splicing of the optical fibers is provided. Therefore, the light transmission efficiency of an optical fiber cable formed of the optical fibers is enhanced, even when the distance is large. Further, the spliced portion of the optical fibers has at least the required mechanical strength.

What is claimed is:

1. A method of fusion splicing single-mode optical fibers, comprising the steps of:
    arranging two single-mode optical fibers in opposed relation along a line;
    aligning the axes of cores of the opposed optical fibers relative to one another thereby forming a splice region;
    measuring an offset distance (D) between axes of the optical fibers when the axes of the cores of the fibers are aligned;
    determining, according to the distance D, an optimum time over which an arc discharge is to be applied to the splice region of the optical fibers, using an inverse relation between the distance D and the discharge time thereby reducing obliquity of the cores after the optical fibers are fusion spliced and enhancing light transmission efficiency of the spliced fibers, while preserving at least a minimum level of mechanical strength of said splice region; and
    applying an arc discharge to the splice region of the optical fibers according to the determined optimum arc discharge time.

2. A method of fusion splicing single-mode optical fibers according to claim 1, in which, when claddings of the optical fibers are made of pure silica and the arc discharge current is fixed at 17mA, said arc discharge time is determined at 1 sec. when said distance between the optical fiber axes is smaller than 1 μm, said arc discharge time is determined at a value linearly reducing from 1 sec. to 0.5 sec. as said distance varies from 1 μm to 4 μm, and said arc discharge time is determined at 0.5 sec. when said distance is larger than 4 μm.

3. A method of fusion splicing single-mode optical fibers, comprising the steps of:
    arranging two single-mode optical fibers in opposed relation along a line;
    aligning the axes of cores of the opposed optical fibers relative to one another thereby forming a splice region;
    measuring an offset distance (D) between axes of the optical fibers when the axes of the cores of the fibers are aligned;
    determining, according to the distance D, an optimum current for an arc discharge to be applied to the splice region of the optical fibers, using an inverse relation between the distance D and the discharge current thereby reducing obliquity of the cores after the optical fibers are fusion spliced and enhancing light transmission efficiency of the spliced fibers, while preserving at least a minimum level of mechanical strength of said splice region; and
    applying an arc discharge to the splice region of the optical fibers according to the determined optimum arc discharge current.

4. A method of fusion splicing single-mode optical fibers according to claim 3, in which, when claddings of the optical fibers are made of pure silica and the arc discharge time is fixed at 1 sec., said arc discharge current is determined at 17 mA when said distance between the optical fiber axes is smaller than 1 μm, said arc discharge time is determined at a value linearly reducing from 17 mA to 15 mA as said distance varies from 1 μm to 4 μm, and said arc discharge current is determined at 15 mA when said distance is larger than 4 μm.

5. A method of fusion splicing single-mode optical fibers, comprising the steps of:
    arranging two single-mode optical fibers in opposed relation along a line;
    aligning the axes of cores of the opposed optical fibers relative to one another thereby forming a splice region;
    measuring an offset distance (D) between axes of the optical fibers when the axes of the cores of the fibers are aligned;
    determining, according to the distance D, an optimum electric energy for an arc discharge to be applied to the splice region of the optical fibers, using an inverse relation between the distance D and the electric energy thereby reducing obliquity of the cores after the optical fibers are fusion spliced and enhancing like transmission efficiency of the spliced fibers, while preserving at least a minimum level of mechanical strength of said splice region; and applying an arc discharge to the splice region of the optical fibers according to the determined optimum electrical energy.

* * * * *